INVENTOR

ALBERT E. FOWLER

Oct. 13, 1964  A. E. FOWLER  3,152,709
STILLAGES AND LIKE TRANSPORTABLE LOAD-CARRYING APPLIANCES
Filed Jan. 26, 1961  4 Sheets-Sheet 3

INVENTOR
ALBERT E. FOWLER

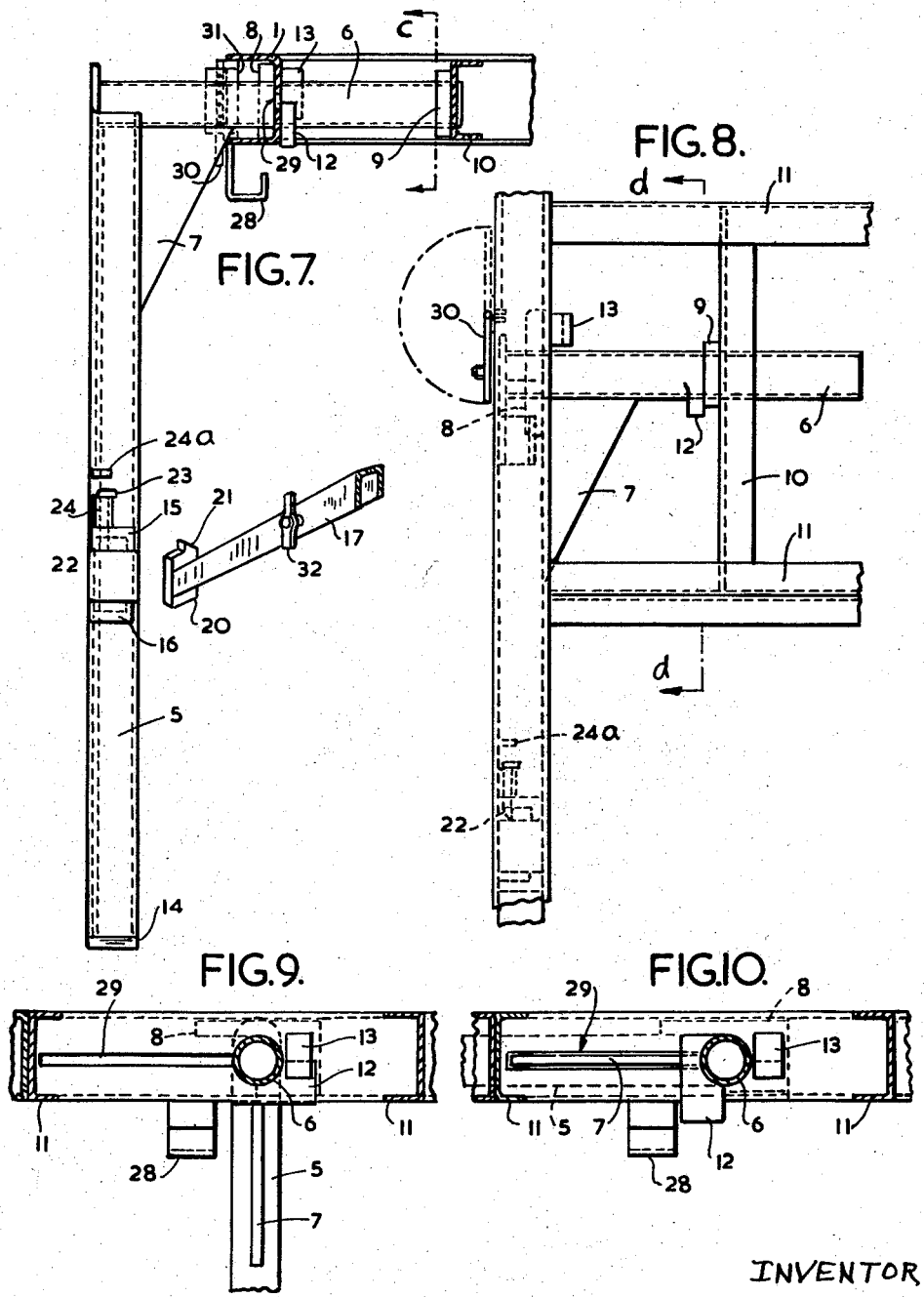

3,152,709
STILLAGES AND LIKE TRANSPORTABLE LOAD-CARRYING APPLIANCES
Albert Edward Fowler, Sheldon, England, assignor to Abelson & Co. (Engineers) Limited, Sheldon, England
Filed Jan. 26, 1961, Ser. No. 85,104
4 Claims. (Cl. 214—515)

This invention has reference to stillages and like transportable load-carrying appliances of the kind comprising a deck or platform which is adapted to be supported by legs at such a distance above ground level that the load-carrying frame of a transporter may be moved to the underside of the deck or platform, whereupon a secondary frame or equivalent member of the transporter may be raised to pick up the appliance and any load which may have been placed on the latter, so that the transporter may then convey the appliance to any desired destination. The stillage may be of any desired size and load-carrying capacity and its deck or platform may be enclosed; also, the transporter may be any kind of vehicle such as a truck, a self-propelled road vehicle, a trailer or the like.

No matter what type of transporter is concerned, it is essential that the legs on the two sides of the deck or platform of the load-carrying appliance, should be spaced apart by a sufficient distance to enable free passage of the transporter ground wheels between them and, in most instances, when the legs are fixed to the said sides, this requirement necessitates the deck or platform being of a width in excess of the overall width of the transporter which, particularly when the latter consists of a road vehicle or a trailer intended to be towed by such a vehicle, may be a disadvantage.

The principal object of the present invention is to provide a stillage or like load-carrying appliance of the above-mentioned kind which overcomes this disadvantage in a simple, expedient and economical manner.

In accordance with the said invention, the head of each leg of the load-carrying appliance is provided with a lateral extension which is longitudinally displaceable relatively to the deck or platform between an idle position adjacent the platform side whereon it is mounted and an operative position located outwardly of and spaced from the said side.

Preferably, the extension is rotatable about its longitudinal axis in the platform of the appliance so that, when in the said idle position, it may be disposed horizontally alongside the platform side whereon it is mounted, means being provided for retaining and locking each of the legs in its idle and operative positions.

If desired, the means for retaining each leg in its idle position may consist of a gusset which is fixed in the angle between the leg and the corresponding lateral extension, the said gusset being adapted to engage a slot in and lengthwise of the corresponding platform side so as to prevent rotation of the leg to its operative position until it has been moved outwardly of the platform to a distance sufficient to disengage the gusset from the slot, whereas the means for retaining the leg in its operative position may consist of a stay of which one end is attached to the platform side by a universal joint so that its opposite and free end may be taken into and out of engagement with a catch provided on and between the ends of the leg.

Each of the platform sides may comprise a channel-section beam of which the mouth opens outwardly of the platform and in which the legs pivoted upon that side are adapted to be inserted and stowed when swung to their idle positions; also, the said side may be provided with depending supports adapted to receive and locate the corresponding stays below and parallel to the beam and means may be provided for locking the legs and stays in the beam and supports respectively.

In order that the invention may be more readily understood and carried into practice, reference will now be made to the accompanying drawings, wherein:

FIGURE 7 is a section along the line b—b, FIGURE 4, showing part of the corresponding stay disconnected from the leg.

FIGURE 8 is a plan of FIGURE 4 showing the leg in its inoperative position.

FIGURE 9 is a section along the line c—c, FIGURE 7, and

FIGURE 10 is a section along the line d—d, FIGURE 8.

Figure 1:
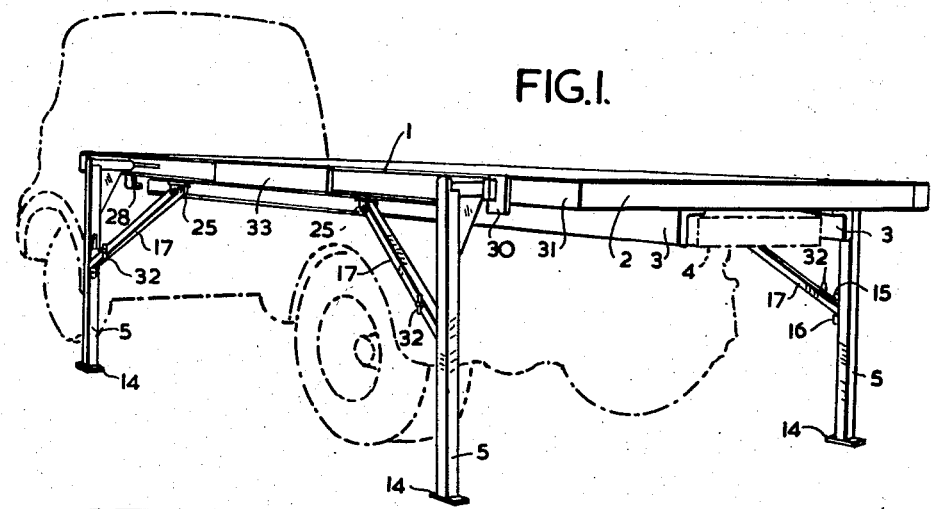
FIGURE 1 is a rear perspective view showing a transportable load-carrying stillage supported by its legs on the ground and, in chain-dot lines, a self-propelled road vehicle reversed under the platform or deck of the stillage preparatory to raising the latter.

The stillage shown in the drawings comprises a rectangular frame of which each side 1 and each end 2 consists of a channel section beam, the two side beams being interconnected by a system of cross-members and being so arranged that their mouths open to the exterior of the frame; a load-carrying deck or platform (not shown) is laid upon the cross-members and, if desired, an open or covered body may be erected on the frame.

The frame is provided with four legs 5 of which two are pivoted respectively in the vicinity of the opposite ends of each of the two sides 1 so that they are adapted to be swung between operative frame-supporting positions in which they depend below and substantially perpendicularly to their respective frame sides, and idle positions in which they are located lengthwise of and parallel to the said sides.

A parallel pair of angle section guide rails 3 is fixed to and between the frame ends 2 on opposite sides of and equidistantly from the longitudinal centre line of the frame. The said rails are fixed to the underside of the lower flanges of the frame ends so that one flange of each rail depends below and perpendicularly to the frame. Hence, when the legs 5 are in their operative positions and are supporting the frame on the ground, and a transporter having a secondary frame 4 capable of being raised and lowered relatively to a main frame or chassis of the transporter, is reversed or otherwise propelled below the stillage frame, the secondary frame is embraced by and travels lengthwise of the depending rail flanges to ensure that the transporter and stillage are in predetermined relative lateral relationship.

Each of the four legs 5 consists of a square-section tube of which one end (hereinafter referred to as the head) is provided with an integral lateral extension 6 which consists of a cylindrical tube and is journalled in and is slidable longitudinally relatively to the associated frame side 1. A gusset 7, of right angle triangular shape, is so secured to and between the head of the leg and the extension that it is located in the angle between, and in the plane of the axes of, the leg and extension and the hypotenuse of the triangle extends from the leg to the extension.

The extension passes through two bearing blocks 8 and 9 of which one is fixed to the base of the frame side 1 and the other is fixed to the base of an auxiliary channel section beam 10 which is secured to and between a corresponding two of the system of frame cross-members 11 inwardly of and parallel to the said frame sides.

Longitudinal displacement of the extension in the stillage frame is limited by a tongue 12 which is provided on the extension between the side 1 and beam 10 so that, as the extension is slid inwardly and outwardly of the frame, it abuts one or other of the two bearing blocks. When in abutment with the block 8, the tongue is also adapted to limit the rotary movement of the extension in the direction which swings the leg to the operative position and to lock the extension against longitudinal movement inwardly of the frame when the leg is in the said operative position; for this purpose, a lug 13 is fixed on the inner surface of the base of the frame side 1, is formed with a jaw which opens to the underside of the frame, and is so located that as the leg reaches the operative position the tongue 12 enters and seats upon the crown of the jaw.

Figure 5:
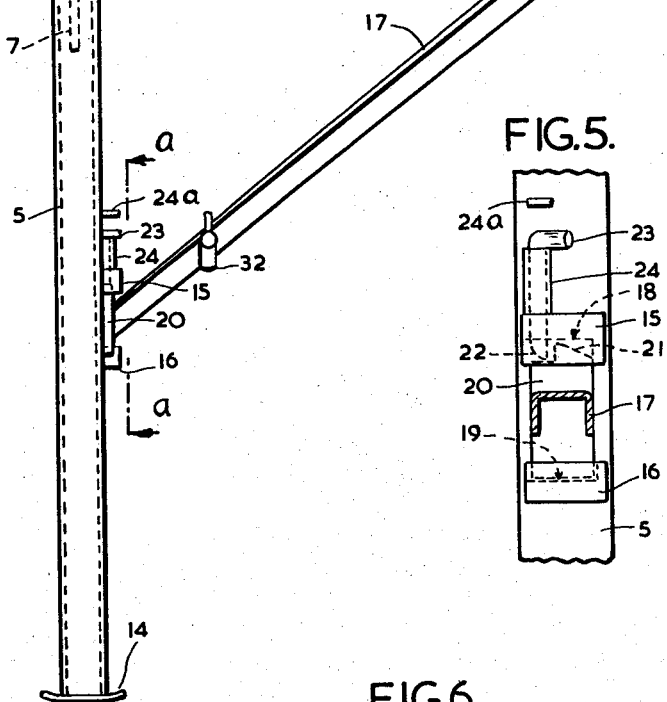
FIGURE 5 is a section along the line a—a, FIGURE 4, the section being on a larger scale than that of FIGURE 4.

The foot of each leg is provided with a ground plate 14 and between the said plate and the gusset 7, two blocks 15, 16 which form parts of a catch whereby the free end of an associated channel section stay 17 is adapted to be detachably connected to the leg so as to secure the latter in the operative position, are fixed upon the side of the leg adjacent to the other of the two legs mounted upon the same side of the stillage frame, the blocks are spaced apart lengthwise of the leg and each of their adjacent edges is formed with a groove 18 and 19 respectively; the grooves extend from the outer edges (that is the edges remote from the stillage frame) of their respective blocks and terminate short of the opposite and inner edges and are of such depths that their bases are spaced apart by a distance equal to the length of a coupling plate 20 fixed upon the free end of the corresponding stay so that the said plate is adapted to be slid endwise into the grooves to anchor the stay to the leg. A stop or shoulder 21 (see FIGURE 5) projects from and perpendicularly to the coupling plate edge which engages the groove 18 in the block nearer the head of the leg, and the said edge is downwardly inclined or chamfered from the top of the shoulder to the inner edge of the plate. Hence, as the coupling plate is slid into and lengthwise of the grooves after the leg has been swung to the operative position, the said inclined or chamfered edge portion abuts and rides along a correspondingly inclined or chamfered face 22 of the nose of a bolt 23 which is carried in and is slidable within a sleeve 24 fixed upon and lengthwise of the leg above the block 15 and projects from the sleeve, through the block and into the groove 18 so that the bolt is lifted and then, as the shoulder clears the chamfered nose, falls downwardly into overlapping relationship with the said shoulder, thereby preventing disengagement of the coupling plate from the groove blocks and locking the stay end to the leg. Upwards movement of the bolt within the sleeve is limited by a stop 24 provided on the leg above the said sleeve and, if desired, the bolt may be loaded by a spring which is housed within the sleeve and tends to drive the bolt downwardly of the leg. The head of the bolt is turned over at right angles or is otherwise formed so as to limit its downwards travel within the sleeve and to provide a ready means whereby the bolt may be slid upwardly by hand to unlock the stay and permit manual disengagement of the coupling plate from the blocks preparatory to swinging the leg to the idle position.

The opposite and anchored end of each stay is attached to the underside of the lower flange of the corresponding side of the stillage frame and between the two legs pivoted upon the said side, by a universal joint so that its free end on which the coupling plate 20 is fixed may be raised and lowered and/or swung inwardly or outwardly of the said frame to take the coupling plate into and out of engagement with the grooved blocks. The said universal joint comprises an inverted U-shaped bracket 25 of which the crown is rotatable about a bolt 26 extending through and fixed to the said lower flange and anchored end of the stay is embraced by and is pivoted to the bracket arms by a pin 27 which is parallel to the flange.

Figure 2:
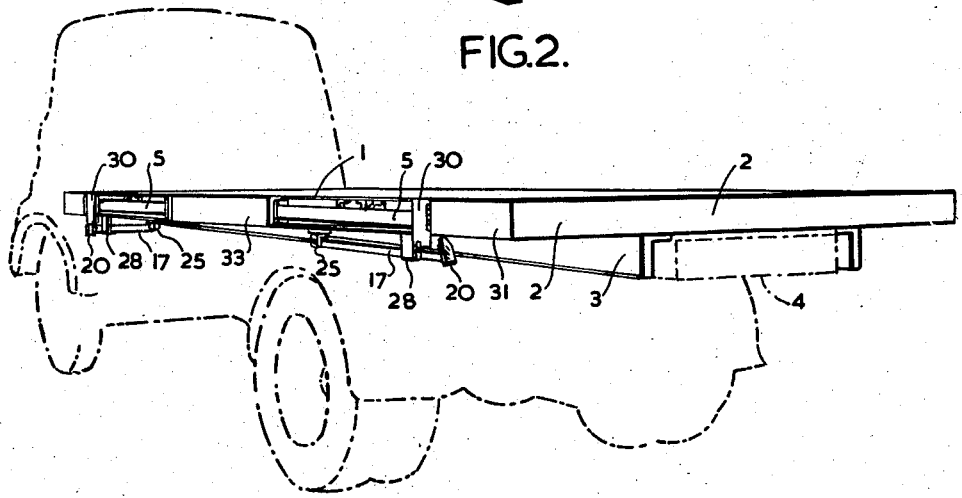
FIGURE 2 is a view, similar to that of FIGURE 1, showing the stillage supported upon the vehicle and the stillage legs in their inoperative positions.
Figure 3:
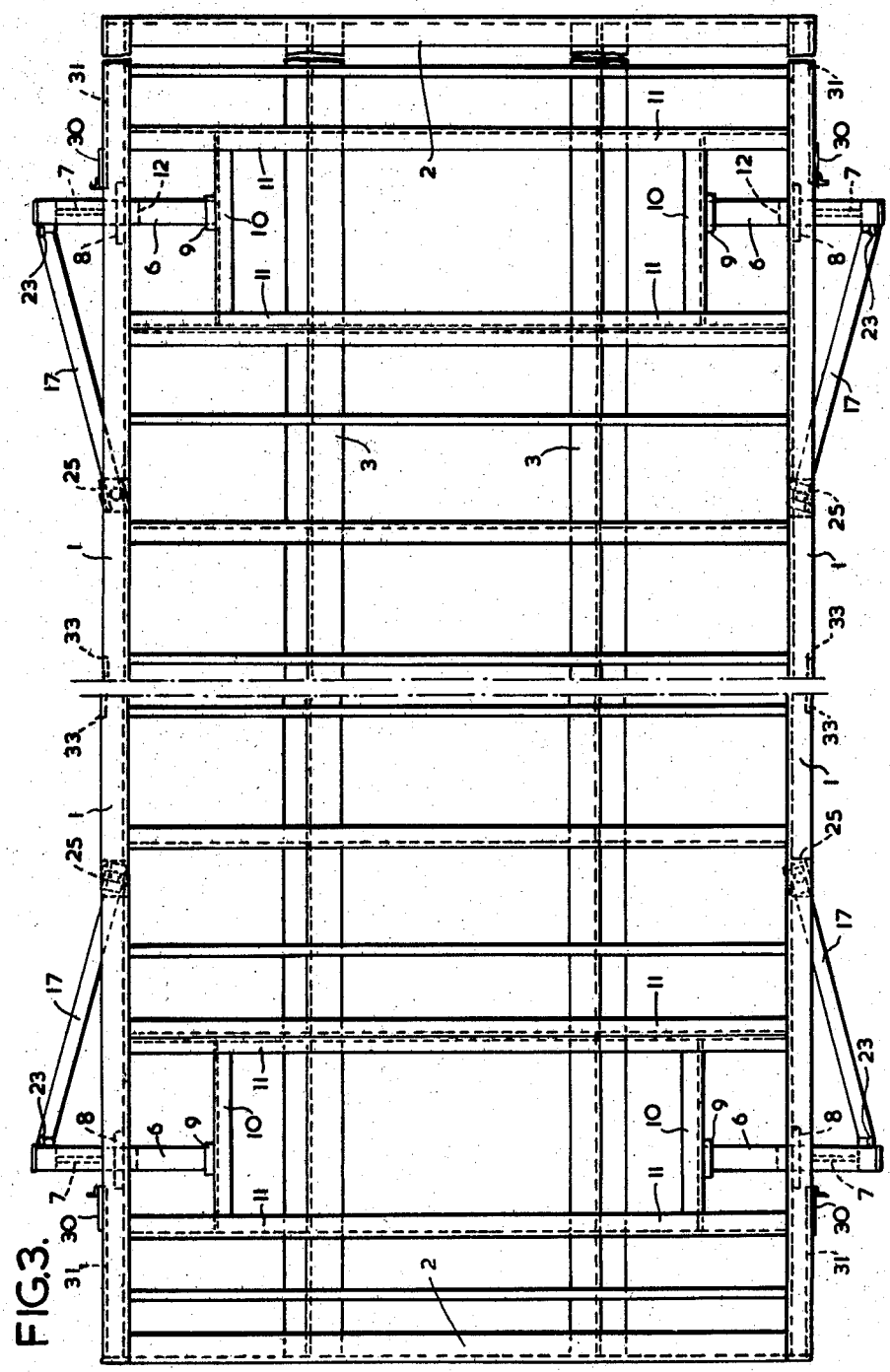
FIGURE 3 is a plan, on an enlarged scale, of the stillage frame, the legs being in the operative positions shown in FIGURE 1.
Figure 4:
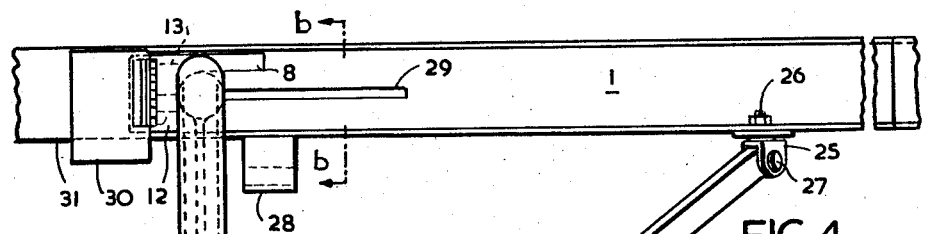
FIGURE 4 is an elevation, on a still larger scale, showing one of the stillage legs in its operative position.
Figure 6:
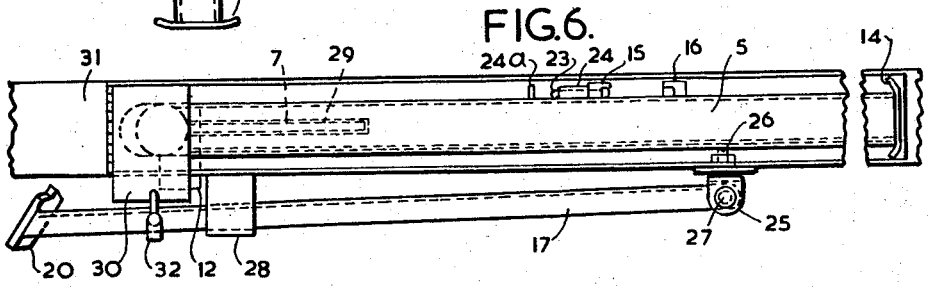
FIGURE 6 is an elevation, similar to that of FIGURE 4, showing the leg in its inoperative position.

Between each universal joint and the associated pivoted leg, a depending U-shaped support 28 of which one arm is longer than the other, is fixed by the free end of its longer arm to the outer edge of the lower flange of the frame side 1 so that the other and shorter arm is located inwardly of the said edge; the upper edge of the said shorter arm is spaced from the underside of the flange by a distance which is sufficient to enable the stay, after being disengaged from the leg, to be passed through the space and lowered on to the base of the support so that the stay is disposed below and parallel to frame side when its free and plated end will project beyond the leg extension 6 (see FIGURES 2 and 6).

The base of each of the two stillage frame sides is formed with two longitudinal slots 29 each of which extends from the bore of a corresponding one of the two bearing blocks 8 towards the other of the said blocks, is located in the same plane as the axes of the two lateral extensions 6 journalled in the frame side, and registers with a radial slot in the corresponding block. Hence, after disengaging the corresponding stay from the catch blocks 15, 16 on any one of the legs and swinging the leg upwardly from the operative position towards the anchored stay end until the leg is level with and parallel to the frame side and thereby disengaging the tongue 12 from the jawed lug 13, and pushing the leg towards the said side, the extension 6 slides through the bearing blocks and the gusset 7 enters the slot 29. The engagement of the gusset in the slot locks the leg against swinging movement in the reverse direction and enables the leg to pass through the mouth of and into the channel section side so that it is supported upon the lower flange of the side.

Preferably, the ground plate 14 is of a length equal to the distance between the flanges of the channel so as to minimise rattle when the stillage is being carried on the transporter and the latter is in motion.

To prevent inadvertent removal of the legs from within their respective frame sides and of the stays from their respective supports 28, a locking plate 30 is associated with each leg and the corresponding stay. The locking plate is hinged by one lateral edge thereof upon the edge of a pillar plate or block 31 secured within the channel mouth between the leg and the adjacent frame end, and is of such a depth that it extends below the stillage frame towards the upper edge of the stay when the latter is carried in its support 28. One end of a turn-buckle 32 which is pivoted upon the outside of the stay, is heavier than the opposite end so that the turn-buckle always tends to assume a vertical position wherein its lighter end reaches above the lower edge of the locking plate. Therefore, when the leg is inserted in the channel side and the stay is carried by its support 28, the locking plate may be turned about its hinged edge into overlapping relationship to the head of the leg and the turn-buckle may overhang the outside of the said plate to prevent the latter from swinging in the reverse direction and to prevent the stay from being removed from the said support.

On the other hand, when the leg is to be returned to the operative position, the turn-buckle is rotated manually upon the stay through 90° to release the locking plate and the plate is swung about its hinged edge clear of the head of the leg so that the latter may be withdrawn from between the flanges of the frame side and the gusset may be disengaged from the slot 29. The disengagement of the gusset from the said slot permits the leg to swing downwardly about the axis of its lateral extension simultaneous sliding movement of the extension outwardly of the frame to bring the tongue 12 into abutment with the bearing block 8, being ensured by the hypotenuse of the gusset making contact with the outer edge of the lower flange of the frame side so that the tongue is aligned and engaged automatically with the jaw of the lug 13 as the leg approaches the operative position in which it is locked by removing the stay from its support and engaging the coupling plate 20 with the grooved blocks 15, 16.

Since the leg is located externally of and is spaced from the frame side when secured in the operative position by the stay, whereas the anchored end of the stay is disposed immediately below the said side, the stay is inclined outwardly of the frame and therefore tends to prevent lateral deflection of the leg. Furthermore, the corresponding legs on the opposite sides of the frame are spaced apart by a distance in excess of the width of the frame so that the said width is equal, or susbtantially equal, to the track of the transporter, there is ample clearance between the legs for the passage of the road wheels of the transporter thereby facilitating the propulsion of the said transporter to the underside of the leg-supported stillage. Nevertheless, having raised the secondary transporter frame to lift the stillage and having engaged the legs in their respective frame sides, the overall width of the stillage is reduced so that it is again equal or substantially equal to the transporter track.

To facilitate the location of the leg-supported stillage in a predetermined position upon a transporter after the transporter has been propelled under the stillage and as the secondary transporter frame is raised so as to lift and support the stillage, at least one socket may be provided on the underside of the stillage frame and a corresponding tapered and upwardly projecting boss may be provided on the said secondary frame. Also, the forward end of the transporter may be provided with one or more stops which project upwardly of the secondary frame so that as the transporter is propelled under the stillage, the said stops in association with the rails 3, are adapted to abut the stillage frame to locate the boss in substantial register with the socket. As the secondary frame is raised, the head of the boss enters the socket mouth and the tapered formation of the boss guides the stillage to the predetermined position on the said frame. Having lifted the stillage upon the secondary frame, the stays are unlocked and disengaged from their respective legs, the stays and legs are inserted into and retained within their depending supports and channel sides respectively, whereupon the secondary frame of the transporter is lowered until the stillage frame rests upon and it supported by the main frame or chassis of the transporter, and catches provided on the forward and rear ends of the transporter chassis, are actuated to engage the lower flanges of channel section cross members of the stillage frame to prevent the stillage bouncing upon the transporter when the latter is travelling over an uneven surface. If desired, the depending stay supports 28 on the opposite sides of the stillage frame may be so spaced apart that they embrace the sides of the transporter chassis as the secondary frame is lowered, thereby assisting in the prevention of lateral movement of the stillage relatively to the said chassis.

To minimise any tendency for the stillage frame to sag when it is loaded whilst being supported by the four legs 5, a reinforcing plate or block 33 is inserted and secured within and midway between the ends of each channelled frame side 1, the said plate or block being of a length substantially equal to the distance between the adjacent ends of the legs pivoted to the frame side when both the legs are inserted between the flanges of the said side.

I claim:

1. A stillage or like transportable load-carrying appliance comprising a frame having two parallel channel side members whose channels open outwardly of the frame, two supporting legs mounted on each of said channel members, each of the said legs having a lateral extension projecting at right angles from its head, said extension engaging in and being displaceable longitudinally and rotatably with respect to bearings carried in the frame to enable the leg to be moved between an idle position wherein it is disposed lengthwise of the channel member on which it is mounted and within the channel of the said member and an operative position wherein it is spaced from and outwardly of the said channel member and is turned to depend perpendicularly from the frame, means for locking each leg in its idle position, and means for locking each leg in its operative position, the said second means for locking including a stay of which one end is mounted upon the underside of the lower flange of said channel member by a universal joint enabling the stay to be swung between a position wherein it lies below and parallel to the said flange and an alternative position wherein it is inclined both downwardly from and outwardly of said flange, and of which the opposite end is provided with a coupling plate slidably engageable between grooved blocks on the leg when said leg is in its operative position, said plate having a shoulder on one block-engaging edge and one of said blocks having a spring loaded and manually retractable bolt for engaging behind said shoulder to prevent disengagement of said plate from said blocks.

2. A stillage or like transportable load-carrying appliance comprising a frame having two parallel channel side members whose channels open outwardly of the frame, two supporting legs mounted on each of the said channel members, each of the said legs having a lateral extension projecting at right angles from its head, said extension engaging in and being displaceable longitudinally and rotatably with respect to bearings carried in the frame to enable the leg to be moved between an idle position wherein it is disposed lengthwise of the channel member on which it is mounted and within the channel of the said member and an operative position wherein it is spaced from and outwardly of the said channel member and is turned to depend perpendicularly from the frame, means for locking each leg in its idle position, and means for locking each leg in its operative position, said first means for locking including a plate which is hinged upon the said channel member and, when the leg is in its idle position, is movable into overlapping relationship with the head of the leg to prevent longitudinal movement of said extension outwardly of the frame, said second means for locking including a stay of which one end is mounted upon the underside of the lower flange of said channel member by a universal joint enabling the stay to be swung about said joint to a position wherein it lies below the said flange and extends beyond but below said hinged plate, a support depending from the underside of said flange adapted to receive said stay when swung to the said position, and a turn-buckle on said stay rotatable to overlap and secure said hinged plate against swinging movement when said plate is swung into overlapping relationship with the head of the leg and the stay is received in the said support.

3. A stillage or like transportable load-carrying appliance comprising a frame having two parallel channel side members whose channels open outwardly of the frame, two supporting legs mounted on each of said channel members, each of the said legs having a lateral extension projecting at right angles from its head, said extension engaging in and being displaceable longitudinally and rotatably with respect to bearings carried in the frame to enable the leg to be moved between an idle position wherein it is disposed lengthwise of the channel member on which it is mounted and within the channel of the said member and an operative position wherein it is spaced from and outwardly of the said channel member and is turned to depend perpendicularly from the frame, first means for locking each leg in its idle position, and second means for locking each leg in its operative position, the said second means for locking including a stay, a universal joint mounting one end of said stay upon said channel member enabling the stay to be swung between a position wherein it lies parallel to the said flange and an alternative position wherein it is inclined both downwardly from and outwardly of said flange, and coupling means having a latching lug on the opposite end of said stay for lockingly engaging a cooperating latch member on said leg when in its operative position.

4. A stillage according to claim 3 wherein said first means for locking includes a triangular gusset which is fixed to the leg and its extension in the right angle included between the leg head and the said extension, said gusset being engageable with a longitudinal slot in the base of the said channel member to prevent rotary movement of the extension in the bearings engaged thereby, said gusset upon removal from said slot by partial longitudinal movement of said extension outwardly of the frame being engageable with and rideable over the edge of the lower flange of said channel member to automatically wedge the extension and leg to their outermost positions during weight engendered turning of the said leg towards its operative position.

References Cited in the file of this patent

UNITED STATES PATENTS

| | | |
|---|---|---|
| 1,303,854 | Clark | May 20, 1919 |
| 1,614,539 | Ryan | Jan. 18, 1927 |
| 1,912,126 | Corduan | May 30, 1933 |
| 2,304,622 | Barrett | Dec. 8, 1942 |
| 2,555,336 | Hagely | June 5, 1951 |
| 2,921,825 | Spiegel | Jan. 19, 1960 |
| 2,925,930 | Parks | Feb. 23, 1960 |
| 2,958,538 | Norris | Nov. 1, 1960 |

FOREIGN PATENTS

| | | |
|---|---|---|
| 700,486 | Great Britain | Dec. 2, 1953 |